United States Patent [19]
Pickett

[11] Patent Number: 5,929,534
[45] Date of Patent: Jul. 27, 1999

[54] DEVICE AND METHOD FOR IMPROVING PERFORMANCE AND COMFORT OF A VEHICLE

[75] Inventor: Stephen J. Pickett, Birmingham, Mich.

[73] Assignee: ITT Manufacturing Enterprises, Inc., Wilmington, Del.

[21] Appl. No.: 08/914,630

[22] Filed: Aug. 19, 1997

Related U.S. Application Data

[60] Provisional application No. 60/038,625, Feb. 19, 1997.

[51] Int. Cl.[6] .................................................. B60K 23/00
[52] U.S. Cl. ...................... 307/10.1; 180/197; 303/139; 701/70; 701/82
[58] Field of Search .................................... 307/9.1, 10.1, 307/118; 180/197, 289, 281; 303/138–150, 113.2; 701/1, 70–84; 318/266

[56] References Cited

U.S. PATENT DOCUMENTS

| | | | |
|---|---|---|---|
| 4,198,573 | 4/1980 | Reneau | 307/10.1 |
| 4,852,469 | 8/1989 | Chuang | 318/266 |
| 5,159,991 | 11/1992 | Tsuyama et al. | 180/197 |
| 5,350,035 | 9/1994 | Bodier et al. | 180/197 |

*Primary Examiner*—Richard T. Elms
*Attorney, Agent, or Firm*—Rader, Fishman & Grauer PLLC

[57] ABSTRACT

A device for improving the performance of a vehicle having a driving unit, a plurality of wheels and wheel brakes is furnished with a moisture sensor indicating the environmental humidity. The moisture sensor provides its information to an electronic controller of a brake system and optionally another automatic device, such as a ventilation system, window control or sunroof control. The knowledge about the humidity is useful to determine the friction coefficient of the road surface. It is advantageous to measure also the environmental temperature to recognize at least temperatures below the freezing point. If the friction coefficient is known, an electronic control unit can estimate the maximum transferable wheel forces or the maximum achievable vehicle acceleration.

18 Claims, 1 Drawing Sheet

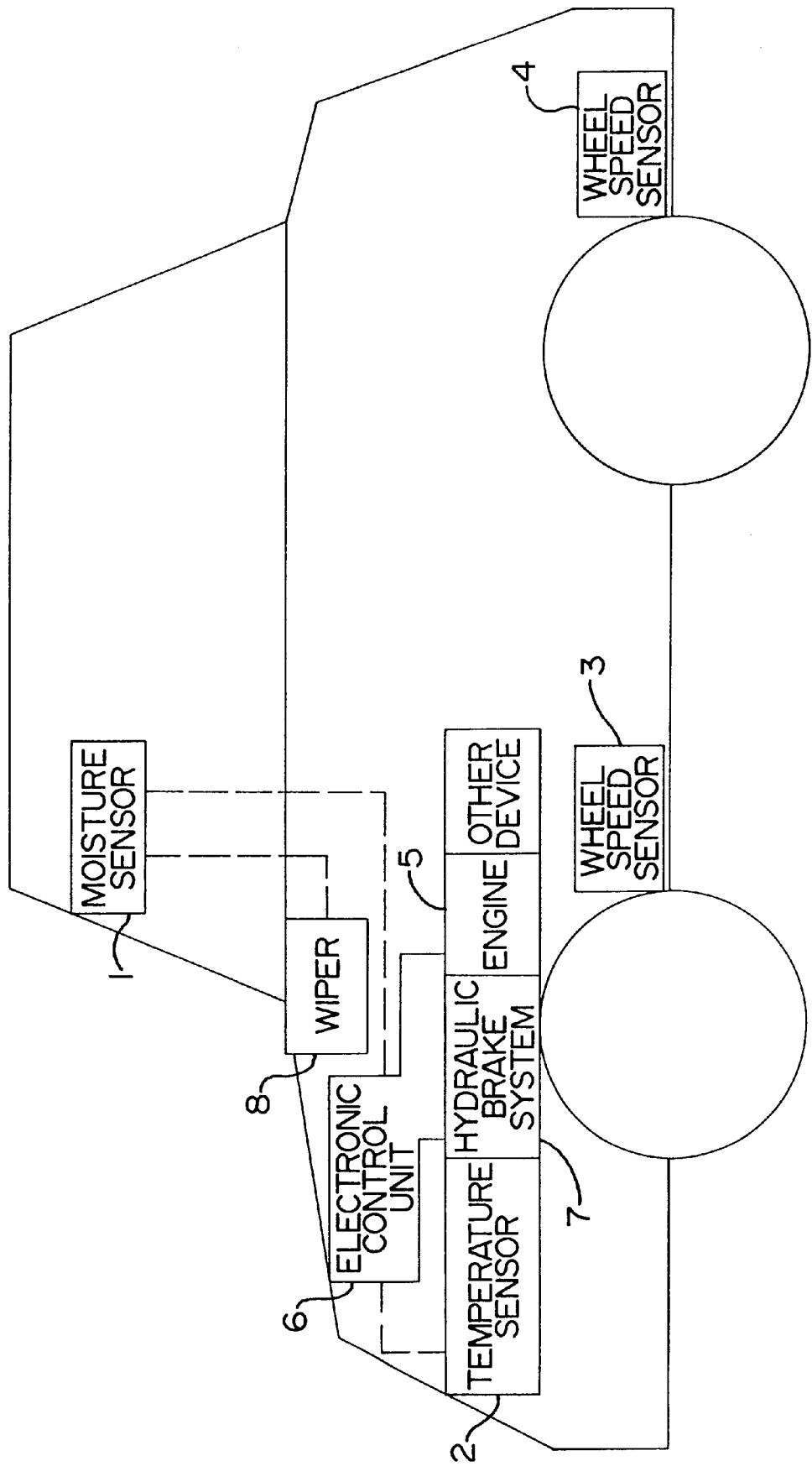

DEVICE AND METHOD FOR IMPROVING PERFORMANCE AND COMFORT OF A VEHICLE

This application is a continuation-in-part of U.S. Ser. No. 60/038,625 filed Feb. 19, 1997.

BACKGROUND OF THE INVENTION

The present invention relates to a device for improving performance and comfort of a motor vehicle.

In addition to the improvement of the passive safety of motor vehicles facilitated by furnishing the vehicles with crumple zones, safety belts and airbags to minimize passengers' risks in case of an accident, the improvement of the active safety of a vehicle is of the same or even higher importance. Active safety devices have the purpose to prevent accidents by controlling the behavior of the vehicle in situations which cannot be consistently mastered by every driver.

For this purpose, several systems have been developed, e.g. antilock brake systems (ABS), traction control systems (TCS) and yaw control systems (YCS) for supporting the driver during cornering. These systems have the goal to prevent unstable driving conditions that occur when a wheel begins to slip on the ground because the maximum static friction has been exceeded.

ABS, for instance, individually lowers the brake pressure during a braking operation actuated by the driver when a wheel threatens to lock. Thus, the respective wheel returns to the range of static friction, and driving stability is recovered.

Similarly, TCS reduces the driving torque when a driven wheel starts spinning. This can be carried out by applying a brake force to the respective wheel or by reducing the power applied to the driven wheels by the driving unit or both.

The YCS is even more sophisticated since it considers also the angular yaw velocity of the vehicle and side forces occurring to each single wheel.

The vector sum of all forces transferred between a wheel and the road surface cannot exceed a certain amount defined by the so-called circle of friction, the radius of which is proportional to the coefficient of friction between wheel and road surface.

In attempting to avoid excessive horizontal forces, it is of interest to know the coefficient of friction. Up to now, no consistent and satisfactory results have been achieved by efforts to measure the coefficient of friction. Therefore, the coefficient of friction usually is derived by processing data gained from wheel sensors detecting the individual wheel speeds.

Also an automation of comfort functions can contribute to the safety of a vehicle by avoiding a distraction of the driver when attention has to be paid to the traffic. Therefore, an automatic assistance of the driver, even comfort related, is desirable whenever outside conditions change.

OBJECT OF THE INVENTION

An object of the present invention is to optimize utilization of information available from sensors installed in a vehicle.

Still another object of the invention is to improve the assessment of the current ground conditions.

A further object of the invention is to provide a moisture detector for transmitting a signal to an active safety system when humidity is detected.

Additionally, a further object of the invention is to avoid unnecessary distractions of the driver.

Still another object of the invention is to utilize a rain detector for actuation of automotive windshield wipers and simultaneously for providing the rain detector signal to one or more active safety systems, such as ABS, TCS and YCS, or to an active environmental control system, such as climate control.

Finally, it is a further object of the invention to avoid damages of a vehicle caused by changes in weather conditions that occur while the vehicle is parked.

SUMMARY OF THE INVENTION

These objects are achieved by providing a moisture sensor communicating with an electronic controller of the vehicle.

Currently, such moisture sensors are used to activate the windshield wipers of the vehicle in case of rain.

The information obtained from a moisture sensor has been discovered to also be useful for controlling other functions enhancing the comfort of driver and passengers, such as the interior ventilation system, automatic side window control, sunroof control, control of a convertible top, and so on. An automation of these functions avoids an unnecessary distraction of the driver during a change of weather conditions.

While the vehicle is parked, a moisture sensor activated closure of side windows, sunroof 1, inflatable top of a convertible, and the like, can prevent damages of the interior of the vehicle when the weather changes.

With respect to the driving safety, humidity is a significant indicator for a reduced coefficient of friction as well. While dry surfaces provide a high coefficient of friction, wet surfaces tend to be slippery.

Therefore, the information about the environmental humidity provided by a moisture sensor can be useful to estimate the maximum forces that can be exerted to the road surface by the wheels. Such forces can be brake forces, driving forces, lateral forces or—in short terms—all horizontal forces between wheel and road.

The moisture sensor output thus can influence the calculations of the electronic controllers providing any kind of strategy of controlling the vehicle behavior by influencing single wheel speeds or the motor torque of the vehicle.

Additionally, a temperature sensor can be provided to predict the presence of frost with the consequence of icy roads as well as to indicate extreme heat influencing the properties of roads and tires.

BRIEF DESCRIPTION OF THE DRAWING

In the drawing, FIG. 1 shows schematically a vehicle equipped with a moisture sensor having a communication path to a wiper system as well as to at least one electronic control unit.

DETAILED DESCRIPTION OF THE DRAWING

In a preferred embodiment of the invention, an automotive vehicle is furnished with a moisture sensor 1, a temperature sensor 2, wheel speed sensors 3 and 4, an engine 5, a hydraulic brake system 7 and, optionally, with one or more other devices n, such as one or more of the following: interior ventilation system, automatic side window control, automatic sunroof control, convertible top, and the like.

The moisture sensor 1 is mounted on the windshield of the vehicle. The moisture sensor 1 provides its signal to a windshield wiper system 8 as well as to an electronic control unit 6 (ECU) controlling the device or devices n, the hydraulic brake system 7 and the control mechanism of the engine 5, normally the fuel control for an internal combustion engine, to prevent unstable driving conditions during braking, acceleration and cornering.

In the ECU 6, a read-only table, a set of empirically derived curves or some other protocol for generating an information signal reflecting a correlation between the value of humidity and the coefficient of friction is stored for the entire range of conditions from completely dry to completely wet and for a temperature range from 20° F. below freezing to temperatures higher than 120° F.

When the ignition of the vehicle is started, the moisture sensor 1 transmits a signal corresponding to the measured humidity value to the wiper system 8 and to the ECU 6. The data flow is continued as long as the ignition is on. For the device or devices n, even a permanently active moisture sensor 1 makes sense for indicating rain or other precipitation while the vehicle is parked.

In case of a high degree of moisture indicating precipitation, an automatic action can be taken by the device or devices n, for instance closing roof and side windows, setting the ventilation so as to keep the windshield free from condensed water, and so on.

The temperature sensor 2 provides the value of the environmental temperature. This can be either atmospheric temperature obtained by a thermometer or road surface temperature detected, for instance, by an infrared sensor. It is of particular interest to recognize situations where ice or snow on the roadway is probable.

If necessary, the wiper system 8 is switched on at a speed depending on the actual humidity.

The ECU 6 compares the humidity value to the stored correlation at the given temperature and predicts a coefficient of friction corresponding to the actual road conditions.

By time-derivation of the reference velocity of the vehicle, usually determined by processing single wheel speeds, the longitudinal vehicle acceleration along is estimated.

The coefficient of friction $\mu$ determines the maximum horizontal forces which can be transferred by the wheels:

$$\mu \geq \frac{\sqrt{F_{long}^2 + F_{lat}^2}}{m * g}$$

with $F_{long}$ being the longitudinal component of the horizontal forces, $F_{lat}$ the lateral component of the horizontal forces, m the vehicle mass and g the gravitational constant.

Since the forces equal the respective vehicle acceleration multiplied by the vehicle mass, the fraction can be reduced, and the equation solved with respect to the lateral acceleration $a_{lat}$ becomes $$a_{lat} \leq \sqrt{(g * \mu + a_{long}) * (g * \mu - a_{long})}$$

All quantities necessary for the calculation of $a_{lat}$ are known.

The derived maximum value of the lateral acceleration can be used to estimate whether cornering with a given steering angle at a certain speed as determined by the driver causes an unstable situation and whether a desired yaw rate indicated by steering angle and velocity can be achieved by stabilizing measures, e.g. by applying brake pressure to the wheel brake of the inner rear wheel if the vehicle shows an understeering behavior. In this context, reference is made to published German patent application No. 195 15 059 corresponding to U.S. Pat. No. 5,671,143, issued on Sep. 23, 1997. This patent application describes in detail how a limitation of the yaw rate depending on the coefficient of friction can be carried out.

Even the best stability control cannot exceed physical limits. If the yaw rate corresponding to the driver's wish cannot be realized because of a too low coefficient of friction, the velocity can be reduced, e.g. by throttling the combustion engine 5.

It is pointed out that the idea of the present invention is not limited to conventional automotive vehicles furnished with a combustion engine 5 and a hydraulic brake system 7. Every vehicle using the friction between wheels and ground to transfer horizontal forces can exhibit improved safety by the knowledge about the environmental humidity. Additionally, taking advantage of a rain sensor signal can provide improved comfort for the driver of any vehicle.

I claim:

1. A driver assistance device for improving performance and comfort of a vehicle, the driver assistance device comprising:

a moisture sensor integral with a windshield wiper system of the vehicle; and an electronic control unit configured and arranged to receive an indication of a moisture level from the moisture sensor, to determine a coefficient of friction between wheels of the vehicle and a driving surface at least in part as a function of the moisture level, and to control at least one automatic function of the vehicle other than the windshield wiper system at least in part as a function of the indication of the moisture level.

2. A driver assistance device, according to claim 1, wherein the moisture sensor is configured and arranged to transfer information to the electronic control unit when the vehicle is parked.

3. A driver assistance device, according to claim 1, wherein the electronic control unit is configured and arranged to control brake forces applied to the wheels by wheel brakes of the vehicle.

4. A driver assistance device, according to claim 1, wherein the vehicle includes a driving unit, and wherein the electronic control unit is configured and arranged to control a traction torque of the driving unit.

5. A driver assistance device, according to claim 1, wherein the electronic control unit is configured and arranged to control driving forces applied to each wheel of the vehicle individually.

6. A driver assistance device, according to claim 1, further comprising a temperature sensor, coupled to provide environmental temperature information to the electronic control unit.

7. A driver assistance device, according to claim 1, wherein the electronic control unit is configured and arranged to control, at least in part as a function of the indication of the moisture level, at least one of an interior ventilation system, a side window, a sunroof, and a convertible top.

8. A method for improving the performance of a vehicle, the method comprising:

using a moisture sensor integral with a windshield wiper system of the vehicle to obtain information related to the humidity outside the vehicle;

providing the information to an electronic control unit of the vehicle;

using the electronic control unit to determine a coefficient of friction between wheels of the vehicle and a driving surface at least in part as a function of the information; and using the electronic control unit to control at least one automatic function of the vehicle other than the windshield wiper system at least in part as a function of the information.

9. A method, according to claim 8, further comprising obtaining the information related to the humidity when the vehicle is parked.

10. A method, according to claim 8, further comprising using the electronic control unit to control, at least in part as a function of the information, at least one of an interior ventilation system, a side window, a sunroof, and a convertible top.

11. A method, according to claim 8, further comprising using the information related to the humidity outside the vehicle to estimate driving surface conditions.

12. A method, according to claim 11, further comprising using a temperature outside the vehicle to estimate the driving surface conditions.

13. A method, according to claim 12, further comprising controlling transmission of forces to the driving surface by the wheels of the vehicle as a function of the information related to the humidity outside the vehicle.

14. A The method, according to claim 13, wherein said forces include brake forces.

15. A method, according to claim 13, wherein said forces include driving forces.

16. A method, according to claim 13, wherein said forces include a combination of longitudinal and lateral forces between each wheel and the ground.

17. A method, according to claim 8, further comprising control acceleration of the vehicle as a function of the information related to the humidity outside the vehicle.

18. A method, according to claim 17, wherein said acceleration includes longitudinal and lateral acceleration components.

* * * * *